Dec. 30, 1924.

H. W. KRAG 1,521,376

CUTTING MACHINE

Filed July 14, 1920

Inventor:
Harry W. Krag,
his Attys.

Patented Dec. 30, 1924.

1,521,376

UNITED STATES PATENT OFFICE.

HARRY W. KRAG, OF ST. LOUIS, MISSOURI, ASSIGNOR TO AMERICAN SHOE MACHINERY & TOOL COMPANY, OF ST. LOUIS, MISSOURI, A CORPORATION OF MISSOURI.

CUTTING MACHINE.

Application filed July 14, 1920. Serial No. 396,055.

*To all whom it may concern:*

Be it known that I, HARRY W. KRAG, a citizen of the United States, and a resident of the city of St. Louis and State of Missouri, have invented a new and useful Improvement in Cutting Machines, of which the following is a specification.

This invention relates principally to cutting machines of the hand-power rotary-cutter type for cutting cloth, rubber, leather and similar fabrics, and is particularly adapted for use in connection with the repair of automobile tires which requires the cutting of shoes and reliners and the removal of the bead from old tires. The principal object of the present invention is a simple and efficient cutting machine of few parts which can be easily operated and kept in proper working order by ordinary tire repair men and car owners. Another object is to provide means whereby the depth of the cut can be regulated, thereby enabling the desired depth of the cut to be maintained without readjusting, and enabling the operator to cut through any desired number of layers of fabric. Another object is to provide a swinging mount for the frame in which the cutter is journaled, whereby the cutter may be swung away from the feed roll to permit tires to be placed in position between the cutter and feed roll without necessitating the cutting in by hand of a starting cut. Another object is a drive gear arrangement which will permit the gears to remain in mesh during all positions of movement of the cutter head, thereby preventing injury to the gear teeth which would result if the gears were thrown into mesh when the cutter and feed roll are brought together. Another object is to provide a means for locking the cutter head in its closed or cutting position and to provide for the adjustment of the locking means, whereby said means can be adjusted for all depths of cut.

The invention consists principally in means for locking the cutter in cutting position and in means for varying the depth of the cut; and it also consists in the parts and in the arrangements and combinations of parts hereinafter described and claimed.

In the accompanying drawing, which forms part of this specification, and wherein like symbols refer to like parts wherever they occur, Fig. 1 is a top plan view of a hand-power cutting machine embodying the invention;

Figure 1:
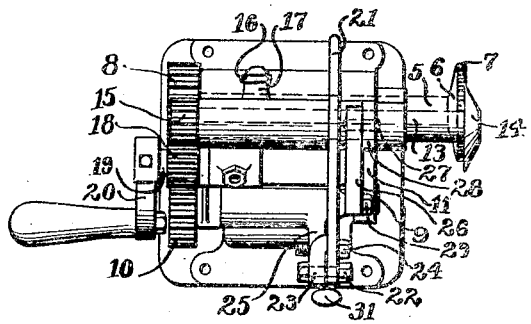
Figure 2:
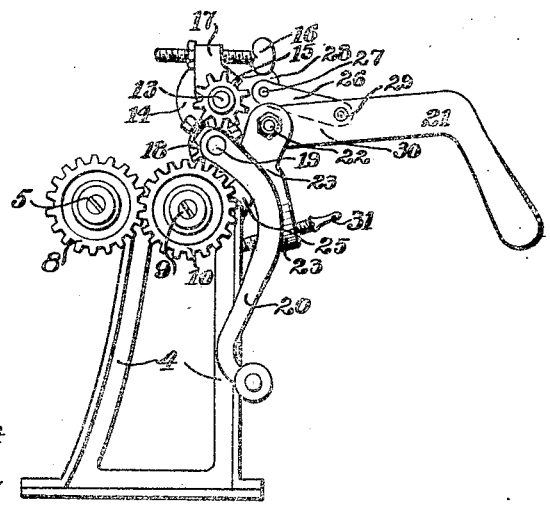
Fig. 2 is an end view of the same.
Figure 3:
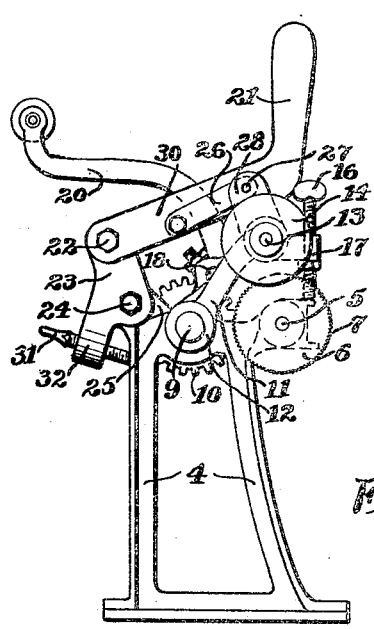
Fig. 3 is a view of the end opposite to the end shown in Fig. 2.

The cutting machine shown in the accompanying drawing comprises an upright frame or standard 4, whose base portion is provided with holes for the reception of bolts or other securing means for securing the frame to a work bench or other suitable support. Journaled in a horizontal bore in the upper part of the standard 4 is a shaft 5, which projects beyond the standard on opposite sides thereof. A feed roll 6, whose edge portion is ribbed or corrugated as at 7, is fixed to one end of the shaft 5, and a driving gear 8 is fixed to the opposite end of said shaft. A second shaft 9 is journaled in a horizontal bore in the upper portion of the standard 4 with its opposite ends projecting on opposite sides thereof. The shaft 9 is disposed parallel with respect to the feed roll shaft 5 and at an equal height therewith. A driving gear 10 is journaled on the end of the shaft 9 adjacent to the gear 8 on the shaft 5 and meshes therewith so as to drive the same.

A frame or cutter head 11 is hinged on the standard 4. This hinged frame or cutter head is provided at its opposite ends with apertured ears or lugs 12 through which the opposite ends of the shaft 9 project, the lugs or ears being preferably pinned to the shaft so as to turn therewith. The lug adjacent to the loosely mounted gear 10 on the shaft 9 is arranged between the standard 4 and the inner face of said gear. This arrangement permits of a swinging movement of the cutter head with the center of the shaft 9 as its center of oscillation, the shaft 9 acting after the manner of a hinge pin.

Journaled in a horizontal bore in the free end of the cutter head, parallel with the shafts 5 and 9, is a cutter shaft 13. The opposite ends of the shaft 13 project beyond the ends of the cutter head, and the end adjacent to the feed roll 6 has a disk cutter 14 fixed thereto.

The opposite end of the shaft 13 has a small gear 15 fixed thereto, the purpose of which will hereinafter appear. The outer face of the cutter disk is beveled to a sharp edge, and its inner flat face is adapted to lap and bear against the adjacent flat surface of the feed roll 6. The extent of the lap between the cutter disk 14 and the feed roll 6 may be varied to cut different thicknesses of material or to cut through any desired number of layers of fabric by means of a vertically disposed thumb screw 16. This adjusting screw 16 is threaded into a horizontally disposed lug or ear 17, which projects outwardly from the outer edge of the pivoted cutter head flush with the under side thereof. The lower end of the thumb screw 16 bears against the top surface of the standard 4 and supports the outer end of the cutter head and maintains the desired lap between the cutter and feed roll when the cutter head is closed.

The cutter shaft 9 and the feed roll shaft 5 are driven by means of a small pinion 18 fixed to the end of a stub shaft 19, which is journaled in a horizontal bore in the cutter head between the hinge shaft 9 and the cutter shaft 13. This drive gear 18 meshes with the gears 10 and 15 fixed to the ends of the cutter shaft 13 and the hinge shaft 9 respectively, and the shaft 19 is provided with a crank handle 20 for manually rotating the same. The gears 15 and 18 are one-half the size of the gears 8 and 10 and thus cause the cutter disk to rotate twice as fast as the feed roll; and the disposition of the drive gears permits the gears to remain in mesh during all positions of the cutter head, thereby doing away with clutching the drive gearing and the wear resulting from such engagement when the cutter head is closed.

The cutter head is raised and lowered by means of a hand lever 21 which has one end pivoted, as at 22, to one arm of a bracket member 23 which, in turn, is pivoted as at 24 to a lug 25 that projects from the rear side of the upright frame 4. The hand lever 21 is connected to the hinged cutter head 11 by means of a locking link 26, which has one end pivotally connected, as at 27, to an upstanding lug 28 on the front side of the cutter head and has its other end pivotally connected, as at 29, to the hand lever 21 at a point between said lug and the hand lever pivot 22. The tendency of the cutter head to rise, by reason of the pressure of the feed roll and cutter disk against the material, is prevented by means of the link 26. This link, together with the hand lever 21, acts after the manner of a toggle, the link 26 forming one of the toggle links and the portion 30 of the lever 21 between the pivots 22 and 29 forming the other toggle link. The portion of the hand lever 21 beyond the pivots 22 and 29 serves as a handle for applying force to the point of junction between the toggle arm 30 and the link 26 to bring the pivots 22, 27 and 29 into a substantially straight line, that is, on dead center or slightly below dead center, to prevent raising of the cutter head and for breaking the toggle by lifting the hand lever to permit the cutter head to be raised.

An adjustable stop in the form of a thumb screw 31 is threaded through an arm 32 of the supporting bracket 23, with its inner end bearing against the upright frame. This screw prevents the pivotally mounted bracket member 23, which pivotally supports the hand lever 21, from being forced backwardly by the endwise pressure on the link 26 which is caused by the tendency of the cutter head to be thrown upward by the pressure of the cutter and the feed roll against the material. The stop screw 31 is adjustable towards and away from the frame 4 to allow the supporting bracket 23 to be rotated to shift the fulcrum point of the hand lever forward or backwards when the adjusting screw 16 is manipulated to increase or decrease the lap between the edges of the cutter and feed roll for the purpose of obtaining the desired depth of cut.

The invention admits of considerable modification without departing from the invention, therefore, I do not wish to be limited to the exact details of construction shown and described.

What I claim is:—

1. A cutting machine comprising circular overlapping cutting members comprising a cutter disk and a feed roll, mechanism for rotating said cutter disk and said feed roll, adjustable means for varying the extent of lap between said cutter disk and feed roll, and means for separating and bringing together said cutter disk and said feed roll and for locking said cutter disk and said feed roll against separation under pressure of the work, said means being capable of adjustment whereby the locking action is obtained regardless of the extent of lap between said cutting disk and feed roll.

2. A cutting machine comprising a stationary frame and a hinged frame having cutting members journaled therein and adapted to cooperate with each other, a hand lever fulcrumed on said stationary frame and having a link connection with said hinged frame whereby said hinged frame can be swung into position with the cutting member thereof in cooperative relation with the cutting member of said stationary frame, the centers of the link and the fulcrum of said hand lever being on a substantially dead center when in said position whereby the cutting members are locked against separation under pressure of the work passing therebetween, and means for adjusting the fulcrum point of said hand lever for varying the distance between the fulcrum point and the point of connection between the link and said hinged frame.

3. A cutting machine comprising a stationary frame having a cutting member journaled therein and a frame hinged thereon having a cutting member journaled therein adapted to cooperate with the cutting member of said stationary frame with their edges overlapping, said hinged frame having a stop thereon adapted to engage the stationary frame for limiting the extent of lap between the cutting members, said stop being adjustable to vary the extent of lap between said cutting members, a hand lever fulcrumed on said stationary frame, and having a link connection with said frame, the centers of said hand lever and of said link being adapted to be brought into a substantially straight line when the cutting members are brought together whereby said cutters are locked against separation under the pressure of the work passing therebetween, and means for adjusting the fulcrum point of said hand lever to bring the centers of the link and hand lever into a substantially straight line when varying the lap between said cutting members.

4. A cutting machine comprising a stationary frame having a cutting member journaled therein and a frame hinged thereon having a cutting member journaled therein adapted to cooperate with the cutting member of said stationary frame with their edges overlapping, said hinged frame having a stop thereon adapted to engage the stationary frame for limiting the extent of lap between the cutting members, said stop being adjustable to vary the extent of lap between said cutting members, a hand lever fulcrumed on said stationary frame and having a link connection with said hinged frame, the centers of said hand lever and of said link being adapted to be brought into a substantially straight line when the cutting members are brought together whereby said cutters are locked against separation under the pressure of the work passing therebetween, means for adjusting the fulcrum point of said hand lever to bring the centers of the link and hand lever into a substantially straight line when varying the lap between said cutting members, and gearing for rotating said cutting members, said gearing being in mesh in all positions of movement of the hinged frame, whereby said cutting members are driven in all positions of their movement.

Signed at St. Louis, Missouri, this 12th day of July, 1920.

HARRY W. KRAG.